(12) United States Patent
Lundgren

(10) Patent No.: US 8,176,810 B2
(45) Date of Patent: May 15, 2012

(54) WIRE ATTACHMENT

(75) Inventor: Bertil Lundgren, Bjärtrå (SE)

(73) Assignee: Nordhydraulic AB, Kramfors (SE)

( * ) Notice: Subject to any disclaimer, the term of this patent is extended or adjusted under 35 U.S.C. 154(b) by 518 days.

(21) Appl. No.: 12/445,400

(22) PCT Filed: Oct. 24, 2007

(86) PCT No.: PCT/SE2007/050773
§ 371 (c)(1),
(2), (4) Date: Apr. 13, 2009

(87) PCT Pub. No.: WO2008/051160
PCT Pub. Date: May 2, 2008

(65) Prior Publication Data
US 2011/0030498 A1    Feb. 10, 2011

(30) Foreign Application Priority Data

Oct. 25, 2006  (SE) ........................ 0602243

(51) Int. Cl.
*F16C 1/12*  (2006.01)
(52) U.S. Cl. ..................................... 74/502.6
(58) Field of Classification Search ............... 74/502.4, 74/502.6; 137/596.1, 596.2, 624.27, 625.69
See application file for complete search history.

(56) References Cited

U.S. PATENT DOCUMENTS

| 3,604,454 | A | * | 9/1971 | Tomko et al. ............. 137/560 |
| 3,878,738 | A | * | 4/1975 | Brooke ..................... 477/156 |
| 4,905,643 | A | * | 3/1990 | DeGrazia, Jr. ............ 123/196 S |
| 4,969,372 | A |   | 11/1990 | Muhlecker et al. |
| 5,560,259 | A |   | 10/1996 | Reasoner |
| 5,664,462 | A |   | 9/1997 | Reasoner |
| 6,523,453 | B2 | * | 2/2003 | Sedoni et al. ............ 91/447 |
| 2006/0053943 | A1 | * | 3/2006 | Motonaga et al. ....... 74/502.4 |

* cited by examiner

*Primary Examiner* — Vicky Johnson
(74) *Attorney, Agent, or Firm* — Stites & Harbison PLLC; Douglas E. Jackson

(57) ABSTRACT

Wire attachment and attachment method for a sheathed wire including a wire and a sheath coaxially surrounding the wire, the wire attachment including: a housing; an axial bore inside the housing including an opening adapted to receive the sheathed wire; a spool slidably arranged inside the bore, the spool receiving the wire and including an engagement member for fixedly engaging the wire, such that any longitudinal movement of the wire will be transmitted to the spool; a sheath attachment member for fixing the sheath to the wire attachment inside the axial bore at a distance from the receiving bore, such that the spool and the wire are free to move axially with respect to the sheath. The sheath attachment member is arranged to exert a substantially radial pressure onto the surface of the sheath, such that it may be attached essentially without disturbing the axial position of the sheath.

5 Claims, 3 Drawing Sheets

WIRE ATTACHMENT

The invention relates to a wire attachment for a wire that is housed inside a rigid sheath. Such wire attachments are used in a wide variety of applications for transferring control commands to a distant device to be controlled. One simple and well known application for such a wire attachment lies in the transferring of breaking commands from a brake handle on a bicycle to the brake shoe on the wheel, on which the braking action is wanted. The wire attachment according to the invention is however mainly intended for use in hydraulic fittings for transferring commands from a control unit or joystick, which is controllable by an operator, to a spool in a spool valve for controlling a hydraulic fluid in e.g. a hydraulic actuating cylinder. Therefore, the invention will in the following be described in that context.

BACKGROUND OF THE INVENTION

Normally after a wire has been attached to a wire attachment it has to be calibrated such that a given maneuvering of the control unit at the first end of the wire produces the desired result on the device to be controlled at the second end of the wire. The calibration is often difficult and time consuming to perform.

Normally, the wire is fastened to a spool at a given distance from the end of the sheath, whereby the position of the end of the sheath needs to be calibrated by moving it forward or backwards with respect to the fixture point of the end of the wire. Conventionally this calibration is performed by longitudinal screwing action on a nut that prevents the end of the sheath from moving longitudinally. The longitudinal screwing action on the nut provides the possibility of calibrating the wire attachment progressively, which is useful as chocks wear down or as compensation for a slacking wire. However, in many applications there is generally no possibility nor need to calibrate the wire attachment continuously. Therefore, once the initial calibration is done the wire attachment should preferably remain calibrated throughout the whole operation.

SUMMARY OF THE INVENTION

An object of the invention is to provide a wire attachment, which is easily calibrated at installation or any other time if necessary, but which is mechanically reliable such that it will normally not be necessary to recalibrate it during normal operation. Such a wire attachment is described hereafter.

According to a first aspect the invention relates to a wire attachment for a sheathed wire including a wire and a sheath surrounding the wire, the wire attachment comprising:
  a housing,
  an axial bore inside the housing including an opening adapted to receive the sheathed wire;
  a spool slidably arranged inside the bore, the spool being adapted to receive the wire and comprises an engagement member for fixedly engaging the wire, such that any longitudinal movement of the wire will be transmitted to the spool,
  a sheath attachment member for fixing the sheath to the wire attachment inside the axial bore at a distance from the spool, such that the spool and the wire is free to move axially with respect to the sheath,
wherein the sheath attachment member is arranged to exert a substantially radial pressure onto the surface of the sheath, such that it may be attached essentially without disturbing the axial position of the sheath.

According to a second aspect the invention relates to a method of attaching a sheathed wire to a wire attachment including a housing, including the steps of:
  inserted the sheathed wire, which includes a wire and a sheath surrounding the wire, into an opening of a bore inside the housing,
  attaching the wire to a spool of the wire attachment adapted to register the position of the second end part of the wire, the spool being kept at an initial position by a separate spring wire attachment.

Further, the method includes the steps of:
  attaching the sheath of the wire without changing the position of neither the wire nor the sheath,
  keeping a control unit, which is connected to the opposite end of the sheathed wire located in a neutral position, such that the relative position of the wire and the sheath corresponds to a neutral or initial position, wherein both the wire and the sheath are attached from the outside of the housing of wire attachment.

The advantages of the invention include the fact that the wire attachment is cheap to manufacture, calibration may be omitted, and the operation of attaching the wire is substantially simplified. Especially the sheathed wire may be attached without removing the housing.

Additional features and advantages of the invention are presented hereafter.

SHORT DESCRIPTION OF THE DRAWINGS

FIG. 4 shows a section of a part of the wire attachment along the line 4-4 in FIG. 2;

FIG. 5 shows a section of a part of the wire attachment along the line 5-5 in FIG. 2.

DETAILED DESCRIPTION OF THE INVENTION

The invention will now be described in detail with reference to the accompanying drawings. In the preferred embodiment of the invention the wire attachment is arranged on a spool valve of a hydraulic system. The wire attachment may however be used in other types of applications.

Figure 1:
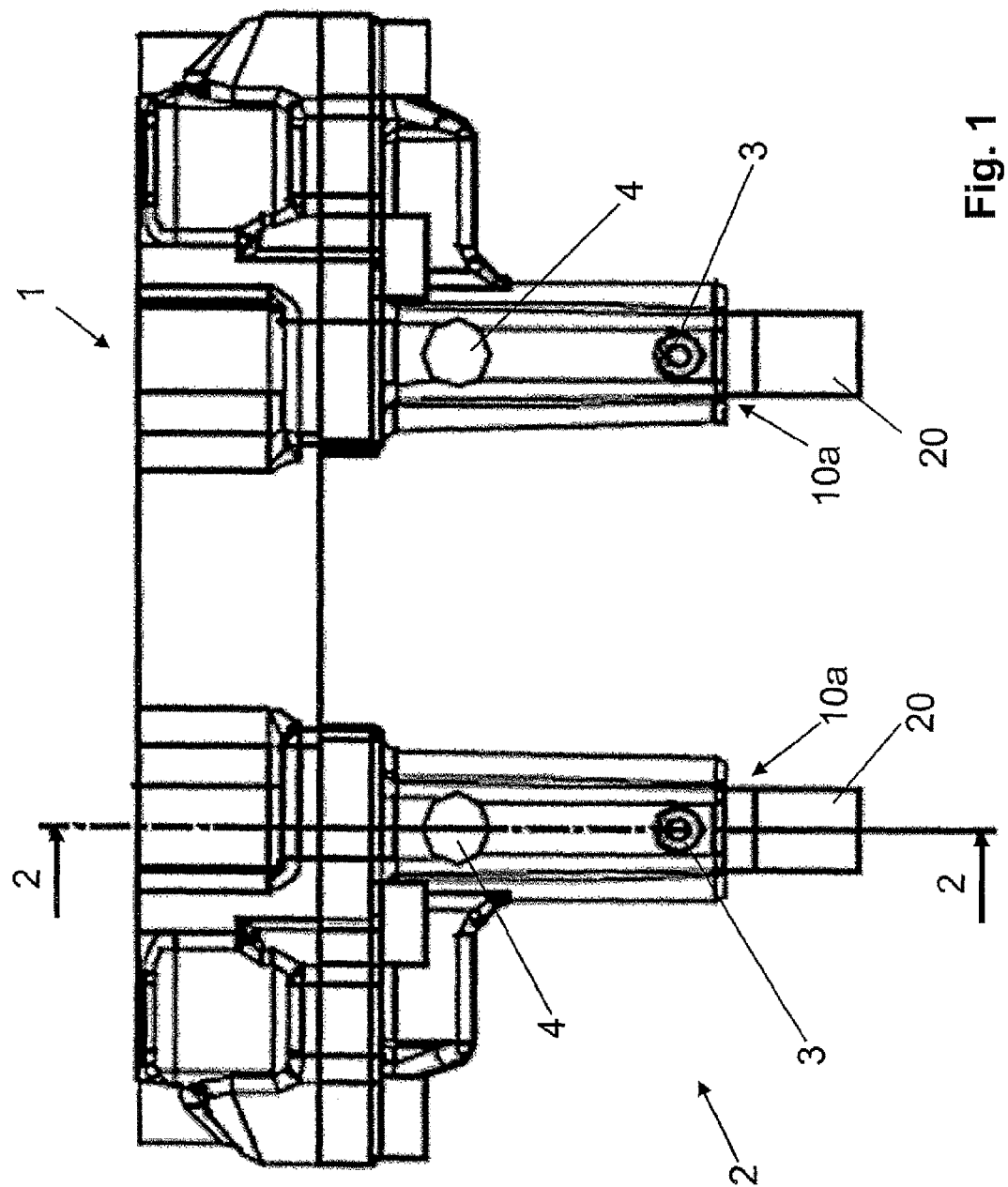
FIG. 1 shows a view of a wire attachment according to the invention, to which two wires are attached.

FIG. 1 shows a wire attachment 1 according to the invention, to which two sheathed wires 20 are attached. The wire attachment 1 is adapted to register and transmit the movement of the two wires to individual spools of a spool valve, which control the movement of a hydraulic fluid in the hydraulic system. The valve itself may be of a type that is well known to a person skilled in the art and will therefore not be described in detail in this application.

The wire attachment 1 includes a casing 2, with openings 10a into which the sheathed wires 20 are inserted. The sheathed wires 20 are fixed inside the casing 2 by sheath attachment members 3, which are screwed into engagement with the sheathed wires 20 through threaded bores (not shown in FIG. 1) in the casing 2. Also visible in FIG. 1 is a cap 4, which covers an access aperture (not shown in FIG. 1) in the housing in order to keep dust or particles from entering said aperture. Most characteristics of the invention are only shown in the cross sectional views of FIGS. 2 and 3, which are referred to below.

The main idea of the wire attachment 1 according to the invention is no different than that of conventional wire attachments, i.e. to transfer control commands that are being conveyed by a sheathed wire to a specific application, in this case a spool valve of a hydraulic system. For that purpose two different attachment members are needed for each sheathed wire 20, one for attaching the sheath 22 surrounding the wire, and one for attaching the wire 21 to a spool 5 that registers the conveyed commands, i.e. the relative position of the wire 21 and the sheath 22. Hence, the sheath 22 must be sufficiently rigid to withstand to be fastened in a manner that guarantees that the wire 21 may move with respect to it. Traditionally the sheath is fixed by means of a screw arrangement, normally including a hexagon nut, through which the wire but not the sheath passes. Generally, the nut may be screwed in order to calibrate the wire attachment by moving it forward or backwards with respect to the fixture point of the end of the wire 21. However, in the arrangement according to the invention the calibration is facilitated in such a manner that no adjustments are necessary after installation. A preferred embodiment of the invention will now be described, with reference to FIGS. 2 and 3.

Figure 2:
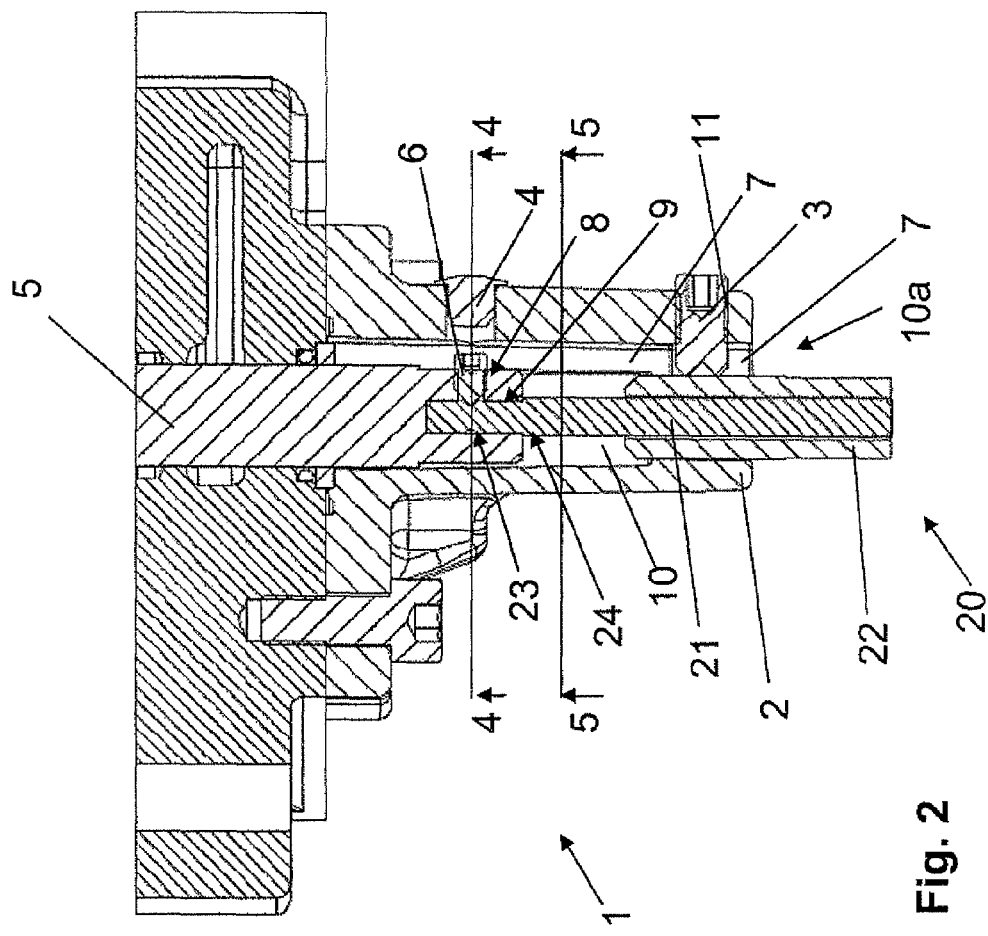
FIG. 2 shows a section of the wire attachment along the line 2-2 in FIG. 1.
Figure 3:
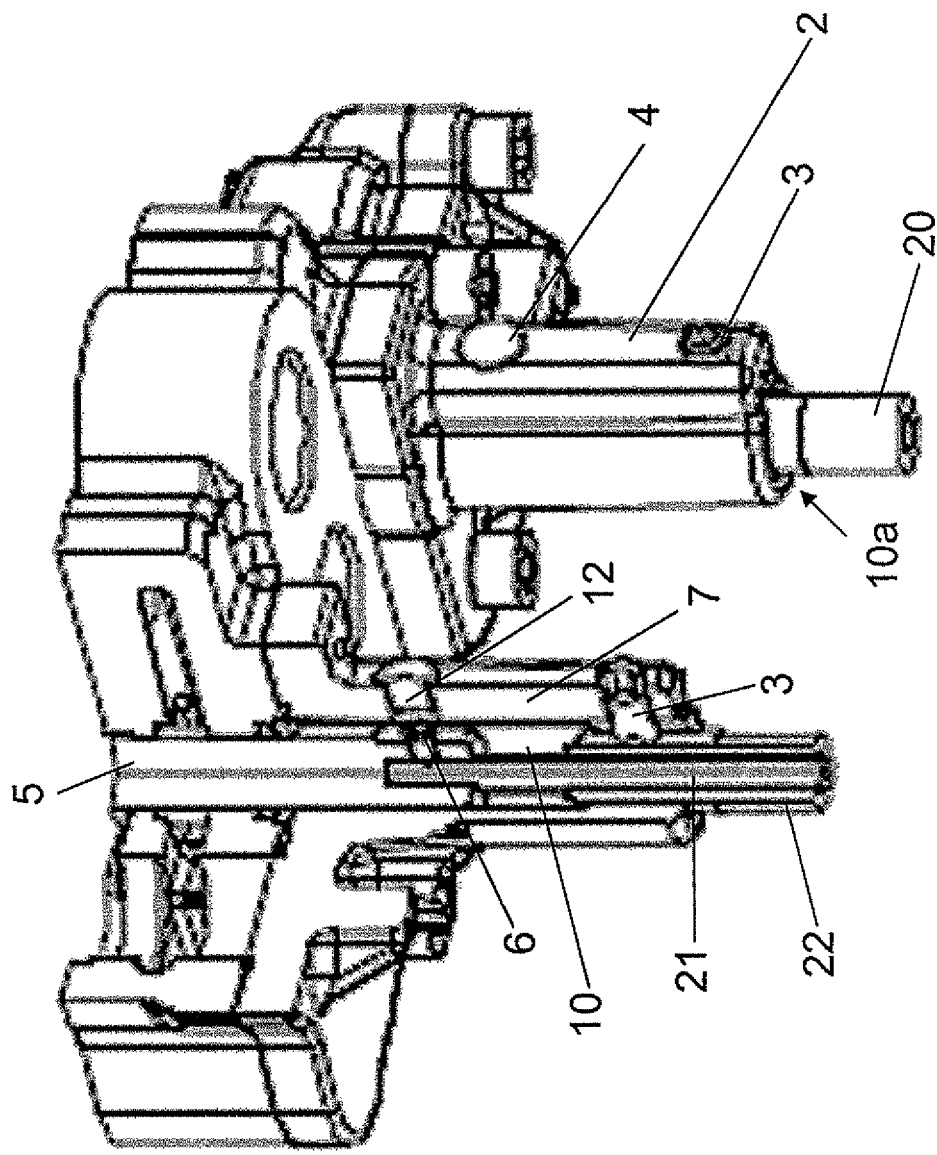
FIG. 3 shows the wire attachment of FIG. 1 partly in cross section.

FIG. 2 shows a cross section of the wire attachment 1 according to the invention along the line 2-2 in FIG. 1. The sheathed wire 20 runs into a axial bore 10 in the wire attachment 1. The sheath 22 of the sheathed wire ends just above the fixture point of the sheathed wire 20, i.e. where a sheath attachment member 3 clamps the sheath 22. An important feature of the invention is that sheath attachment member 3 is arranged such that it exerts a radial pressure on the outer surface of the sheath 22. In the shown embodiment the sheath attachment member 3 comprises a retaining screw, which is to be screwed substantially perpendicular into engagement with the outer surface of the sheath 22. Preferably, both the end surface of the sheath attachment member 3 and the circumferential surface of the axial bore 10 adjacent the screw 3 have a rough surface adapted to keep the sheath from moving. For instance the end surface of the sheath attachment member 3 is provided with one or several circular rims that engage the sheath 22. Above the end of the sheath 22 the end part of the wire 21 protrudes unsheathed. Of course, other types of sheath attachment means are possible, such as a circumferential pressing means.

Inside the axial bore 10 the end part of the wire 21 is fastened in a slidably arranged spool 5, which registers the commands conveyed by the wire. The spool 5 comprises a receiving bore 9 for receiving the end part of the wire 21 and an engagement member 6 for fixedly engaging the end part of the wire 21 in the receiving bore 9, such that any longitudinal movement of the end part of the wire 21 will be transmitted to the spool 5. In the preferred embodiment, the receiving bore 9 consists of a bore of a diameter adapted to receive the end part of the wire 21. Further, in the preferred embodiment the engagement member 6 consists of a threaded fixing piece 6 which is screwed into contact with the end part of the wire 21 through a threaded bore 8 on a side of the spool 5.

A spring arrangement (not shown) is arranged on the spool 5, such that the spool 5 is forced towards an initial position, i.e. the position shown in FIG. 2. The spring action of the spring wire attachment is sufficiently strong to keep the spool 5 from moving while the end part of the wire 21 is being fastened inside it. Preferably this initial position corresponds to an initial position on the control unit, such that the position of the end part of the wire 21 is directly calibrated with respect to the control unit once it has been fastened. Thus, the wire attachment according to the invention is especially favourable in combination with a control unit with a lockable neutral position.

In the shown embodiment the calibration is further facilitated in that the opening that allows access to the engagement member is arranged such that the engagement member may only be accessed when the spool is at its initial position. This is evident from FIGS. 4 and 5, which show cross sections of a part of the wire attachment along the lines 4-4 and 5-5 in FIG. 2, respectively. Preferably, the engagement member 6 has a length that exceeds the length of the opening 8 through the spool 5, such that part of it extends outside the outer side surface of the spool 5 and forms a protrusion on the outer surface of it. A track 7 is arranged in connection to the axial bore 10, in which the extending part of the engagement member fits tightly. In use, the engagement member 6 is adapted to slide axially in the track 7 as the spool 5 is moved up and down, and after operation when it is desired to disconnect the end part of the wire 21 from the wire attachment 1 it suffices to replace the maneuverable control unit to the initial position, whereby the spool 5 will be moved to its corresponding initial position such that the engagement member 6 may once again be accessed through the aperture 12 of the wire attachment's 1 casing 2. As stated above the spool is preferably spring loaded, such that it will automatically be repositioned into its initial position without needing to manoeuvre the control unit.

Preferably, the track 7 protrudes below the sheath attachment member 3 and all the way down to the opening 10a of the wire attachment 1. Thus, the track 7 also functions as a drainage such that liquid, e.g. a hydraulic liquid, may be drained from the inside of the housing, e.g. in the case of leakage.

The engagement between the protruding engagement member 6 and the track 7 will keep the spool 5 from rotating, such that the engagement member faces the side with the opening of the spool 5 at all times. Naturally, other mating arrangements, which are independent of the engagement member 6 may be provided in order to keep the spool 5 from rotating in the axial bore 10.

The end part of the wire 21 is generally constituted of a steel bar which is crimped on to the wire. In some applications, where the forces on the wire are small, a piano wire may however be used and the steel bar may be omitted, such that the wire itself is fixed to the spool.

Preferably, the end part of the wire 21, i.e. the steel bar, is provided with a notch or a ring or any other type of indication 23 for facilitating engagement with the engagement member 6. The indication 23 is configured to improve the connection between the end part of the wire 21 and the receiving bore 5. In the shown embodiment the indication 23 consist of an annular notch with which the engagement member 6 is adapted to mate. Further, the wire may be provided with a shoulder 24, which does not fit inside the bore of the receiving bore 9. The shoulder 24 is adapted to indicate that the end part of the wire 21 has reached its desired initial position, in which the indication 23 is in line with the opening 8 of the spool 5, which at installation is adapted to be in line with the aperture 12 in the casing 2. Thus, the indication 23 and the shoulder 24 are so positioned with respect to each other that when the shoulder 24 abuts the inlet end of the receiving bore 5, the indication 23 is positioned in line with the engagement opening 8 of the spool 5. Hence the shoulder 24 is useful for correctly positioning the indication 23, and consequently the end part of the wire 21. An alternative to the shoulder 24 could be to machine the receiving bore 9 to a specific depth exactly corresponding to the length of the end part of the wire 21. It is, however rather difficult and thus expensive to bore a hole with such an exact depth. Thus, the shoulder 24 provides a solution, which is both less expensive and more precise.

Hence, the aperture 12 in the casing 2 of the wire attachment 1 provides access to the engagement member 6, such that it may be fastened or unfastened from outside of the wire attachment 1. In the case where the engagement member is a screw a screw driver is inserted through the aperture 12 in the casing to fasten or fasten the engagement member 6. To protect the interior of the casing 2 from dirt the aperture 12 is provided with a cap 4 during normal operation.

In the following a preferred method of attaching the sheathed wire 20 to the wire attachment 1 according to the invention will be described. The first step is to make sure that the control unit and the spool 5 are in their respective initial positions, e.g. the neutral position. This is a prerequisite for assuring the immediate calibration of the wire attachment 1. Thus, the control unit is locked in neutral position, if that is possible on the specific control unit, whereas the spool is kept at its initial position by means of the provided spring arrangement. As long as the control unit is locked in neutral position the sheath 22 and the wire 21 are fixed with respect to each other. If the used control may not be locked in neutral position, it as advisable to let two operators install the wire in the wire attachment; one for connecting and for keeping the control unit in neutral position.

The sheathed wire 20 is then inserted into the inlet end 10a of the bore 10 of the wire attachment 1 and the end part of the wire 21, which is unsheathed, is inserted into the receiving bore 9 of the spool 5. Thus, the operator installing the wire holds the sheath 22 and presses it upwards until it stops, i.e. when the shoulder 24 of the end part of the wire 21 has reached the mouth of the receiving bore 9 in the spool. The force needed to move the spool 5 is of such magnitude that it is almost impossible to move it with hand power, wherein it is practically guaranteed that it is kept in the initial position throughout the installation. The engagement member 5 is then brought into engagement with the indication 23, which preferably has the form of an annular track on the end part of the wire 21, such that the wire is fixed inside the spool 5.

Subsequently, the sheath 22 is fixed to the wire attachment 1. The sheath 22 is fixed by manipulation of the sheath attachment member 3. In the shown embodiment the sheath attachment member 3 consists of a screw that is screwed through an opening 11 near the inlet end of the wire attachment 1. If the control unit, controlling the wire, is kept at the neutral position when the sheath attachment member is being attached to the sheath the calibration may be omitted.

The invention claimed is:

1. Wire attachment for a sheathed wire including a wire and a sheath surrounding the wire, the wire attachment comprising:
   a housing,
   an axial bore inside the housing including an opening adapted to receive the sheathed wire;
   a spool slidably arranged inside the axial bore, the spool being adapted to receive the wire and comprising an engagement member for fixedly engaging the wire to the spool, such that any longitudinal movement of the wire will be transmitted to the spool,
   a sheath attachment member for fixing the sheath inside the axial bore at a distance from the spool, such that the spool and the wire are free to move axially with respect to the sheath,
   wherein the sheath attachment member is arranged to exert a substantially radial pressure onto the outer surface of the sheath whereby the sheath attachment member may be attached essentially without disturbing the axial position of the sheath,
   an aperture is provided through one side of the housing giving access to manipulation of the engagement member in the axial bore from outside of the housing, and
   a mutual engagement between the spool and the axial bore allowing axial movement therebetween but preventing rotational movement of the spool inside the axial bore, such that that the engagement member will always face the side of the housing comprising the aperture.

2. Wire attachment according to claim 1, wherein the sheath attachment member comprises a retaining screw arranged to be screwed substantially perpendicular into engagement with the outer surface of the sheath.

3. Wire attachment according to claim 1, wherein the mutual engagement includes a track arranged longitudinally in the axial bore, the engagement member being arranged to protrudes with respect to the exterior surface of the spool and forming a projection which fits into said track, whereby the projection of the engagement member and the track interacts such that the spool may slide axially in the bore but is prevented from rotational movement.

4. Wire attachment according to claim 1, wherein the mutual engagement includes a track which extends continuously to the opening of the axial bore, thus providing a drainage from inside the axial bore past the sheath attachment member to outside of the housing.

5. Wire attachment according to claim 1, wherein the spool is spring loaded towards an initial position, and wherein the engagement member is positioned in line with the aperture in the housing when the spool is in an initial position thereof.

\* \* \* \* \*